US007899918B1

(12) United States Patent
Potter et al.

(10) Patent No.: US 7,899,918 B1
(45) Date of Patent: Mar. 1, 2011

(54) SERVICE ACCOUNTING IN A NETWORK

(75) Inventors: Darren Potter, Kent (GB); John Zamick, Somerset (GB)

(73) Assignee: Cisco Technology, Inc., San Jose, CA (US)

( * ) Notice: Subject to any disclaimer, the term of this patent is extended or adjusted under 35 U.S.C. 154(b) by 1220 days.

(21) Appl. No.: 10/683,918

(22) Filed: Oct. 10, 2003

(51) Int. Cl.
*G06F 15/16* (2006.01)
(52) U.S. Cl. .......... 709/229; 709/202; 709/224; 709/228
(58) Field of Classification Search .................. 709/229
See application file for complete search history.

(56) References Cited

U.S. PATENT DOCUMENTS

| 5,204,961 | A | 4/1993 | Barlow |
| 5,272,754 | A | 12/1993 | Boerbert |
| 5,586,260 | A | 12/1996 | Hu |
| 5,590,199 | A | 12/1996 | Krajewski, Jr. et al. |
| 5,757,916 | A | 5/1998 | MacDoran et al. |
| 5,835,727 | A | 11/1998 | Wong et al. |
| 5,898,780 | A | 4/1999 | Liu et al. |
| 5,944,824 | A | 8/1999 | He |
| 5,987,232 | A | 11/1999 | Tabuki |
| 5,991,810 | A | 11/1999 | Shapiro et al. |
| 6,006,334 | A | 12/1999 | Nguyen et al. |
| 6,011,910 | A | 1/2000 | Chau et al. |
| 6,047,376 | A | 4/2000 | Hosoe |
| 6,061,799 | A | 5/2000 | Eldridge et al. |
| 6,092,196 | A | 7/2000 | Reiche |
| 6,119,160 | A | 9/2000 | Zhang et al. |
| 6,219,790 | B1 | 4/2001 | Lloyd et al. |
| 6,263,369 | B1 | 7/2001 | Sitaraman et al. |
| 6,298,383 | B1 | 10/2001 | Gutman et al. |
| 6,434,700 | B1 | 8/2002 | Alonso et al. |
| 6,947,725 | B2 * | 9/2005 | Aura ............................ 455/410 |
| 7,203,190 | B1 * | 4/2007 | Ruban et al. .................. 370/356 |
| 2002/0046277 | A1 * | 4/2002 | Barna et al. ................... 709/224 |
| 2002/0159442 | A1 * | 10/2002 | Quigley et al. ............... 370/352 |
| 2003/0035409 | A1 * | 2/2003 | Wang et al. ................... 370/349 |
| 2004/0258031 | A1 * | 12/2004 | Zabawskyj et al. .......... 370/338 |

OTHER PUBLICATIONS

Jones et al. WO 03/030483 "Method and System for Session Accounting in Wireless Networks." Apr. 10, 2003. WIPO International application publication.*
C. de Laat, et al., "Generic AAA Architecture," Aug. 2000, Network Working Group, Request for Comments: 2903, http://www.ietf.org/rfc/rfc2903.txt?number=2903, data retrieved Mar. 2, 2004, pp. 1-23.
J. Vollbrecht, et al., "AAA Authorization Framework," Aug. 2000, Network Working Group, Request for Comments: 2904, http://www.ietf.org/rfc/rfc2904.txt?number=2904, data retrieved Mar. 2, 2004, pp. 1-31.
G. Zorn, "Microsoft Vendor-specific RADIUS Attributes," Mar. 1999, Network Working Group, Request for Comments: 2548, http://www.ietf.org/rfc/rfc2548.txt?number=2548, data retrieved Mar. 2, 2004, pp. 1-36.

(Continued)

*Primary Examiner* — Larry Donaghue
*Assistant Examiner* — Nicholas Taylor
(74) *Attorney, Agent, or Firm* — Hickman Palermo Truong & Becker LLP (57) ABSTRACT

A method and apparatus are disclosed for improving service accounting in a network. After a client is authorized and authenticated, an accounting record is sent with the authorization accept message, and the account record is logged.

31 Claims, 5 Drawing Sheets

OTHER PUBLICATIONS

C. Rigney, et al., "Remote Authentication Dial in User Service (RADIUS)," Jun. 2000, Network Working Group, Request for Comments: 2865, http://www.ietf.org/rfc/rfc2865.txt?number=2865, data retrieved Mar. 2, 2004, pp. 1-67.

C. Rigney, "RADIUS Accounting," Jun. 2000, Network Working Group, Request for Comments: 2866, http://www.ietf.org/rfc/rfc2866.txt?number=2866, data retrieved Mar. 2, 2004, pp. 1-25.

G. Zorn, et al., "RADIUS Accounting Modifications for Tunnel Protocol Support," Jun. 2000, Network Working Group, Request for Comments: 2867, http://www.ietf.org/rfc/rfc2867.txt?number=2867, data retrieved Mar. 2, 2004, pp. 1-10.

G. Zorn, et al., "RADIUS Attributes for Tunnel Protocol Support," Jun. 2000, Network Working Group, Request for Comments: 2868, http://www.ietf.org/rfc/rfc2868.txt?number=2868, data retrieved Mar. 2, 2004, pp. 1-18.

B. Aboba, "IANA Considerations for RADIUS (Remote Authentication Dial in User Service)," Jun. 2003, Network Working Group, Request for Comments: 3575, http://www.ietf.org/rfc/rfc3575.txt?number=3575, data retrieved Mar. 2, 2004, pp. 1-8.

M. Chiba, et al., "Dynamic Authorization Extensions to Remote Authentication Dial in User Service (RADIUS)," Jul. 2003, Network Working Group, Request for Comments: 3576, http://www.ietf.org/rfc/rfc3576.txt?number=3576, data retrieved Mar. 2, 2004, pp. 1-27.

L. Blunk, et al., "PPP Extensible Authencation Protocol (EAP)," Mar. 1998, Network Working Group, Request for Comments: 2284, http://www.ietf.org/rfc/rfc2284.txt?number=2284, data retrieved Mar. 2, 2004, pp. 1-14.

B. Aboba, et al., "PPP EAP TLS Authentication Protocol," Oct. 1999, Network Working Group, Requests for Comments: 2716, http://www.ietf.org/rfc/rfc2716.txt?number=2716, data retrieved Mar. 2, 2004. pp. 1-22.

B. Aboba, et al., "Authentication, Authorization and Accounting (AAA) Transport Profile," Jun. 2003, Network Working Group, Request for Comments: 3539, http://www.ietf.org/rfc/rfc3539.txt?number=3539, data retrieved Mar. 2, 2004, pp. 1-36.

B. Aboba, et al., "RADIUS (Remote Authentication Dial in User Service) Support for Extensible Authentication Protocol (EAP)," Sep. 2003, Network Working Group, Request for Comments: 3579, http://www.ietf.org/rfc/rfc3579.txt?number=3579, data retrieved Mar. 2, 2004, pp. 1-41.

P. Congdon, et al., "IEEE 802.1x Remote Authentication Dial in User Service (RADIUS) Usage Guidelines," Sep. 2003, Network Working Group, Request for Comments: 3580, http://www.ietf.org/rfc/rfc3580.txt?number=3580, data retrieved Mar. 2, 2004, pp. 1-27.

P. Calhoun, et al., "Diameter Base Protocol," Sep. 2003, Network Working Group, Request for Comments: 3588, http://www.ietf.org/rfc/rfc3588.txt?number=3588, data retrieved Mar. 2, 2004, pp. 1-129.

K. Zeilenga, "Lightweight Directory Access Protocol version 3 (LADAPv3): All Operational Attributes," Network Working Group, Request for Comments: 3673, http://www.ietf.org/rfc/rfc3673.txt?number=3673, data retrieved Mar. 2, 2004, pp. 1-5.

K. Zeilenga, "Feature Discovery in Lightweight Directory Access Protocol (LDAP)," Dec. 2003, Network Working Group, Request for Comments: 3674, http://www.ietf.org/rfc/rfc3674.txt?number=3674, data retrieved Mar. 2, 2004, pp. 1-5.

L. Howard, "An Approach for Using LDAP as a Network Information Service," Mar. 1998, Network Working Group, Request for Comments: 2307, http://www.ietf.org/rfc/rfc2307.txt?number=2307, data retrieved Mar. 2, 2004, pp. 1-19.

* cited by examiner

| Client IP Address 310 | Server IP Address 320 | Random String 330 |

FIG. 4

| Protocol: Attribute = Value 410A | Protocol: Attribute = Value 410B | Protocol: Attribute = Value 410N |
|---|---|---|

FIG. 5

SERVICE ACCOUNTING IN A NETWORK

FIELD OF THE INVENTION

The present invention generally relates to client-server communication in a network. The invention relates more specifically to techniques for improving service accounting in a network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In client-sever systems that include authorization of clients, it is important to maintain accounting information for the clients that are authorized to access the system. In a typical system, a client attempts to connect to a network device (e.g., a wireless access point) and an authentication and authorization protocol is initiated. The network device requests credentials, which the client then supplies. The credentials are passed to an authentication, authorization, and accounting (AAA) server, which looks up additional information on the client to make a decision about the whether the client should be granted access.

After making the decision, in implementations that use the Remote Authentication Dial In User Service protocol (RADIUS) protocol, the AAA server returns an access accept message, an access reject message, or 'silently discards' the request if it is invalid. If an access reject message is returned, then the client is denied access. If an access accept message is returned, then the client is granted access and the network device sends the AAA server a session start record which the AAA server writes to its logs.

When the client's session ends, the device generates an accounting stop record which it sends to the AAA server to write to its logs.

A problem with such systems, however, is that they do not keep track of the reason why a client was accepted or rejected by the AAA server. This is important for a number of reasons, including aiding system debugging and identifying fraudulent users, analysis, audit, and reporting.

Historically, this problem was partially resolved by the logging service provided by some AAA servers running RADIUS or Terminal Access Controller Access Control System protocol (TACACS+) and was deemed adequate for the requirements of the network administrators running the network access service. In part, this was sufficient because the AAA server architecture was a relatively simple two-tier client/server application with access to all user information in its own database. This meant that the AAA server was able to log any additional data already stored within its own database relatively easily by injecting the extra data into the AAA accounting packets as they passed through that server. This methodology required that the same AAA server that granted authentication also processed the accounting packets for the corresponding session. This methodology also required the AAA server to cache the information that was used to make the authorization decision.

Now, however, AAA servers often need to access one or more external identity repositories to get the data needed to make an authentication decision, and a number of AAA servers may be load balanced and thereby share the AAA processing workload. For example, Lightweight Directory Access Protocol (LDAP) directories may hold needed user identity data. In addition, driven by increasingly rigorous security requirements, there is a need for richer audit and accounting record logging. In these systems, the 'raw' data provided by the network device via RADIUS accounting is insufficient and must be augmented with additional identity related information, for example:

The entity's (user or device) real name and department code

The entity's group membership (within the corporate repository and/or the AAA server)

Other policy data known by the AAA policy server at authentication time (e.g. applied role, policy and provisioned profile name)

Such identity-related information is not held by the AAA server, but, instead, is retrieved from external repositories when required to service incoming the authentication and authorization components of AAA requests. As noted above, this data is needed for later logging, but since the data is not local, a solution is needed for retaining or re-retrieving this information.

In one possible approach, the data is cached locally at the AAA server. One problem with this approach is that caching the data limits load balancing of AAA servers and would require the AAA server to keep state for each client session. That is, if the AAA server cached all required information, then the RADIUS accounting messages, also known as Call Data Records (CDR), would then have to be routed through the same AAA server that performed the authentication.

In another approach, the AAA server would have to fetch the additional information a second time, and possibly more times, in order to augment logging records. The problem with this approach is that it at least doubles the load on the external repository being imposed by the AAA server and the network traffic required to service that load.

Another problem with both of these approaches is that the AAA server must investigate, i.e. parse and interpret, each incoming message to determine whether it needs to be augmented with additional accounting information. This would unduly increase the processing burden on the AAA server.

Based on the foregoing, there is a clear need for a solution that can enable accounting of authorization decision and other accounting information without requiring state on or additional data-fetching by the AAA server, while still allowing AAA server load-balancing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for improving service accounting in a network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Data Packet
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for improving service accounting in a network, the method comprising the steps of authorizing and authenticating a client; sending an authorization accept message that includes an accounting record; and causing the accounting record to be logged.

In a related feature, the method further comprises the step of obtaining the accounting record for the client from an external resource. In a related feature, the method further comprises the step of obtaining the accounting record for the client from an external repository of user information such as a Lightweight Directory Access Protocol directory or an Relational Database Management System using the appropriate protocol. In a related feature, the client is selected from the group consisting of a wireless network client, a wired network client, and a dial up client.

In a related feature, the step of causing to be logged comprises causing the accounting record to be logged on a dedicated logging device. In a related feature, the step of causing to be logged comprises causing the accounting record to be logged on an authentication, authorization, and accounting server. In a related feature, the step of causing to be logged comprises causing the accounting record to be logged on a network device. In a related feature, the step of causing to be logged comprises logging the accounting record with a session start log entry. In a related feature, the step of causing to be logged comprises logging the accounting record with a session stop log entry.

In a related feature, the accounting record comprises a handle to a second accounting record. In a related feature, the method further comprises the steps of retrieving the second accounting record using the handle to the second accounting record; and causing the second accounting record to be logged.

In a related feature, the accounting record comprises data in a plurality of attribute-value pairs. In a related feature, the step of sending is performed in a protocol selected from the group consisting of Remote Authentication Dial In User Service, Terminal Access Controller Access Control System, Diameter, and Security Assertion Markup Language. In a related feature, a particular data set is used in the step of authenticating and authorizing and the accounting record comprises the particular data set.

In another aspect, a method is provided for improving service accounting in a network, the method comprising the steps of sending an authorization request; receiving an accounting record with an authorization accept message; and causing the accounting record to be logged. In a related feature, the step of causing to be logged comprises causing the accounting record to be logged on a dedicated logging device.

In a related feature, the step of causing to be logged comprises causing the accounting record to be logged on an authentication, authorization, and accounting server.

In another aspect, a computer-readable medium is provided for carrying one or more sequences of instructions which, when executed by one or more processors, causes the one or more processors to perform any of the foregoing methods.

2.0 Structural and Functional Overview

Figure 1:
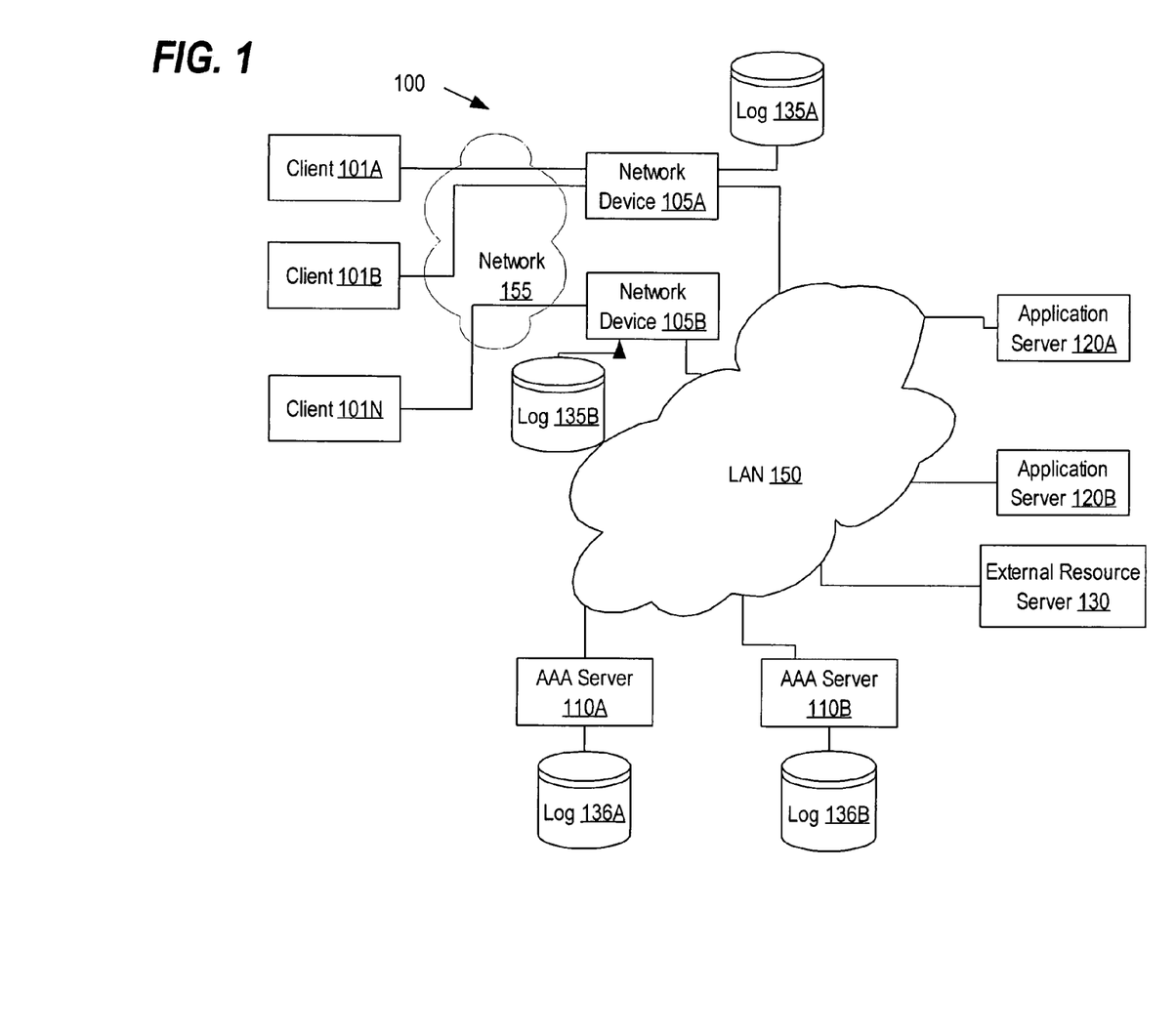
FIG. 1 is a block diagram depicting example architectural components and layout for improving service accounting in a network.

FIG. 1 is a block diagram depicting example architectural components and layout for improving service accounting in a network.

Multiple clients 101A, 101B, 101N are communicatively coupled to one or more network devices 105A, 105B. In one embodiment, the communication is over a network 155. In various embodiments, the network 155 is a wireless network, dial up access, the Internet, a local area network (LAN), or another appropriate communication network. In various embodiments, the network devices 105A, 105B are wireless access points, virtual private network devices, network access servers, switches, routers, or other appropriate devices.

The network devices 105A, 105B are communicatively coupled to a LAN 150. In various embodiments, the LAN 150 is a wireless network, dial up access, the Internet, or any other appropriate communications network. In one embodiment, the network devices 105A, 105B are communicatively coupled to logs 135A, 125B, respectively. In various embodiments, logs 135A, 125B are Relational Database Management System (RDBMS), databases, a flat files, or any other appropriate storage mechanisms.

Application servers 120A, 120B are communicatively coupled to the LAN 150. An external resource servers 130 is communicatively coupled to the LAN 150. In various embodiments, these external resource servers are directory services, databases, LDAP directories, flat files, RDBMS, or any other appropriate means for storing and disseminating information.

One or more AAA servers 110A, 110B are each communicatively coupled to the LAN 150 and to logs 136A, 136B, respectively. In various embodiments, the AAA server is an access control server, a RADIUS AAA server, or another appropriate server that are capable of authorizing a client.

Consider this example of a functioning system of FIG. 1. The network device 105A acts as a filter for a client 101A, controlling what the client 101A can reach in the rest of the system 100, including the client's 101A access to the application servers 120A, 120B. The network device 105A accounts for of all of the activity that passes through it via a log 135A. When a client first tries to access a resource such as an application server 120A in the system 100, the network device 105A communicates with one of the AAA servers 110A, 110B to authenticate and authorize the client 101A. In order for the AAA server 110A to decide whether to authorize a client 101A, the AAA server 110A retrieves information from an external resource server 130. This communication is accomplished through the LAN 150. The authorization, authentication, and all other activity at the AAA server 110A are accounted for in a log 136A.

Figure 2:
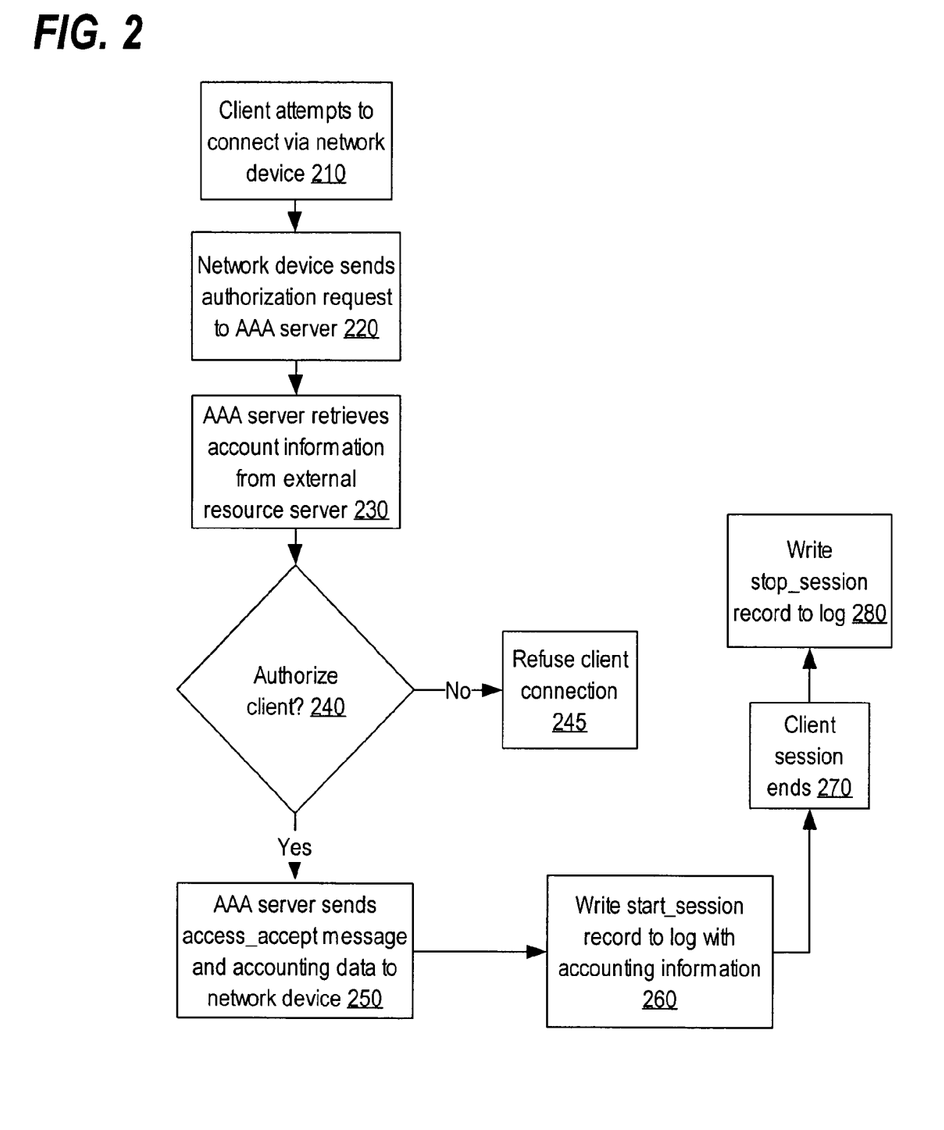
FIG. 2 is a flow diagram depicting an example flow of steps for improving service accounting in a network.

FIG. 2 is a flow diagram depicting an example flow of steps for improving service accounting in a network.

A client attempts connection to a server via a network device, block 210. In various embodiments, the client is a wireless client, a wired network client, a dial up client, or other appropriate clients. In various embodiments, the network device is a wireless access point, a virtual private network device, a network access server, a switch, a router, or another appropriate devices. For example, in the context of FIG. 1, a client 101A attempts to connect to a server 120A via a network device 105A.

Upon this attempted connection of a client, a network device sends an authorization request to an AAA server, block 220. In various embodiments, an AAA server is an access control server, a RADIUS AAA server, or another appropriate server that is capable of authorizing a client. In various embodiments, the functions of an AAA server and a network device are performed on a single process running on a single processor; on multiple threads of a single process running on a single processor; on multiple processes on a single processor; and as separate processes on separate processors; or as multiple processes running on separate processors. For example, in the context of FIG. 1, a network device 105A sends an authorization request to an AAA server 110A.

If information is needed to authorize a client that is not present on an AAA server, the information is retrieved from an external resource server, block 230. In various embodiments, external resource servers are directory services, databases, Lightweight Directory Access Protocol (LDAP) directories, or another appropriate resource server such as an RDBMS. In various embodiments, some of the information is retrieved from the AAA server and some of the information is retrieved from an external resource server; or all of the information is retrieved from an external resource server. For example, in the context of FIG. 1, an AAA server 110A retrieves account information from an external resource server 130 and from the AAA server 110A.

An AAA server then makes a decision whether to authorize a client, block 240. In one embodiment, this decision is based on accounting information. For example, in the context of FIG. 1, an AAA server 110A decides whether to authorize a client 101A based on information retrieved in step 230.

If a client is not authorized, then the client is refused, block 245. In various embodiments, a client is allowed to attempt reconnection; is disallowed to attempt reconnection for a specified time period; or is disallowed reconnection indefinitely. For example, in the context of FIG. 1, the client's 101A connection is refused and is notified of that refusal by the network device 105A.

If a client is authorized, an access accept message is sent to a network device, block 250. In various embodiments, an accounting record includes name, date, or other information appropriate for logging. In various embodiments, the accounting record comprises all of the information that an AAA server used to make an authorization decision, a handle or reference to information appropriate for logging, or a reference to all of the information that the AAA server used to make the authorization decision. For example, in the context of FIG. 1, an AAA server 110A sends an access accept message to a network device 105A containing all of the information that the AAA server 110A used to authorize a client 101A.

It is appropriate to send a handle referencing the data used for the authentication decision to a network device when the network is congested. In this approach, a log process later can retrieve the data using the handle for combining a network device's log with the referenced data. It is appropriate to send the data itself in the access accept message when it is difficult to combine a log of a network device which contains references and the referenced data itself, and otherwise when it is important that the logs themselves contain the data. Specific embodiments are described further below.

In various embodiments, the format of a message carrying an accounting record is a set of attribute-value pairs sent in a RADIUS Class Attribute or a set of attribute-value pairs sent in a RADIUS Vendor Specific Attribute.

Upon receiving an access accept message, the network device starts the client session. At that time, a start session message and accounting record are written to a log, block 260. In one embodiment, a network device writes a start session accounting record message to a local log. In another embodiment, a network device sends a message containing a start session accounting record message to an AAA server; the AAA server then writes the information to a log. In yet another embodiment, the network device sends a message containing a start session message and an accounting record to a dedicated logging device, which then logs the information. In various embodiments, the dedicated logging device is a RDBMS, database, a flat file, or any other appropriate storage.

In one embodiment, an accounting record includes data passed with an access accept message. In another embodiment, a network device writes some of the data in the accounting record to a log and will store it in a cache. In various related embodiments, a cache for a network device is a local memory, a database, a directory service, or other appropriate caches. In various embodiments, a log is a RDBMS, database, a flat file, or another appropriate storage mechanism. For example, in the context of FIG. 1, a network device 105A writes a start session accounting record to its log 135A.

After some time a client session will end, block 270. For example, in the context of FIG. 1, a client 101A finishes accessing an application server 120A and logs out of a system 100.

After a client session has ended, a network device stops the client session. At that time, a stop session message is written to a log, block 280. In various embodiments, a network device writes the stop session message to a local log; the network device sends a message containing the stop session message to an AAA server, and the server writes the information to a log; or the network device sends a message containing the stop session message to a dedicated logging device, which then logs the information.

In various embodiments, the stop session record includes the data passed from an AAA server with an access accept message; or can be correlated with a start session record. For example, in the context of FIG. 1, a network device 105A will write a stop session record to a log 135A for a client 101A whose session has ended, and that stop session record will include data, which was used to authorize the client 101A, sent from the AAA server 110A.

In one embodiment, a client will migrate from a first network device to a second network device before the client's session ends. In a related embodiment, enough information is passed between a first network device and a second network device to enable the client's session to continue and not need reauthorization; and the second network device will write a stop session record after the client session has ended. For example, in the context of FIG. 1, a client 101A migrates from a first network device 105A to a second network device 105B. The second network device 105B writes the stop session message to a log 135B.

In the embodiments described above, the access accept message, start session message, and the stop session message conform to the RADIUS protocol but include the additional data described above.

In summary, in performing the foregoing steps, the system keeps a detailed record of the data associated with authorization of a client without needing state at the AAA server, without having the AAA server perform multiple reads from the external resource, and without the AAA server needing to monitor packets to determine if it needs to inject data into the packet in order to complete the records to be written to the logs. The steps provide sufficient accounting information while at the same time, allowing AAA servers to be stateless, load balanced, and less burdened.

3.0 Implementation Mechanisms—Data Packet

There are many possible formats in which an accounting record could be sent. Two broad categories of these are data handles and data packets. In various embodiments, accounting record data is sent via a RADIUS Vendor Specific Attribute, a RADIUS Class Attribute, or another appropriate fields in messages of appropriate protocols. In one embodiment, when data handles are used, a unique identifier is used as a reference to the data.

Figure 3:
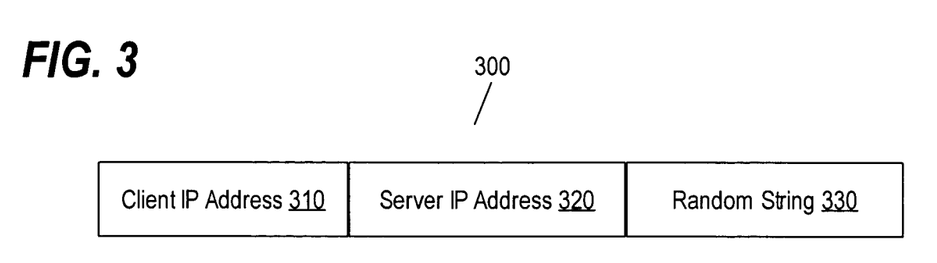
FIG. 3 is a diagram of an example unique identifier used to reference data.

FIG. 3 is a diagram of an example unique identifier used to reference data. An identifier 300 comprises a combination of a client Internet Protocol (IP) address 310, an AAA server IP address 320, and a random string 330. In various embodiments, the identifier is a random string; a timestamp combined with client IP address; or another appropriate identifier that uniquely identify the reference data among other data. For example, in the context of FIG. 1, a unique identifier is a combination of a client 101A IP address, an AAA server 110A IP address, and a random string.

Figure 4:
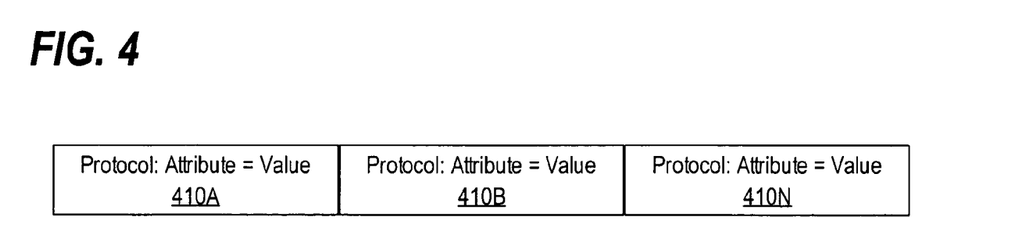
FIG. 4 is a diagram of an example data packet message format using a series of attribute value pairs.

In one embodiment, accounting records are sent as data packets. FIG. 4 is a diagram of an example data packet message format using a series of attribute value pairs. The message consists of one or more sections 410A, 410B, 410N that contain data in the format of "Protocol: Attribute=Value". In various embodiments, the format "Attribute=Value"; "Attribute:Value"; or other appropriate formats are used.

Some protocols, such as RADIUS, mandate that class attributes are returned un-modified by the client device in the subsequent accounting packets. In one embodiment, the RADIUS protocol is used; an accounting record is sent in RADIUS Class Attributes; and that data is returned with all subsequent accounting packets. In another embodiment, the RADIUS protocol is used; an accounting record is sent in RADIUS Vendor Specific Attributes; and that data is returned with all subsequent accounting packets. In various embodiments, RADIUS, TACACS+, Diameter, Security Assertion Markup Language (SAML), or other appropriate protocols capable of passing accounting data are used. Such protocols and a solution using them provide simplicity in implementation.

4.0 Implementation Mechanisms—Hardware Overview

Figure 5:
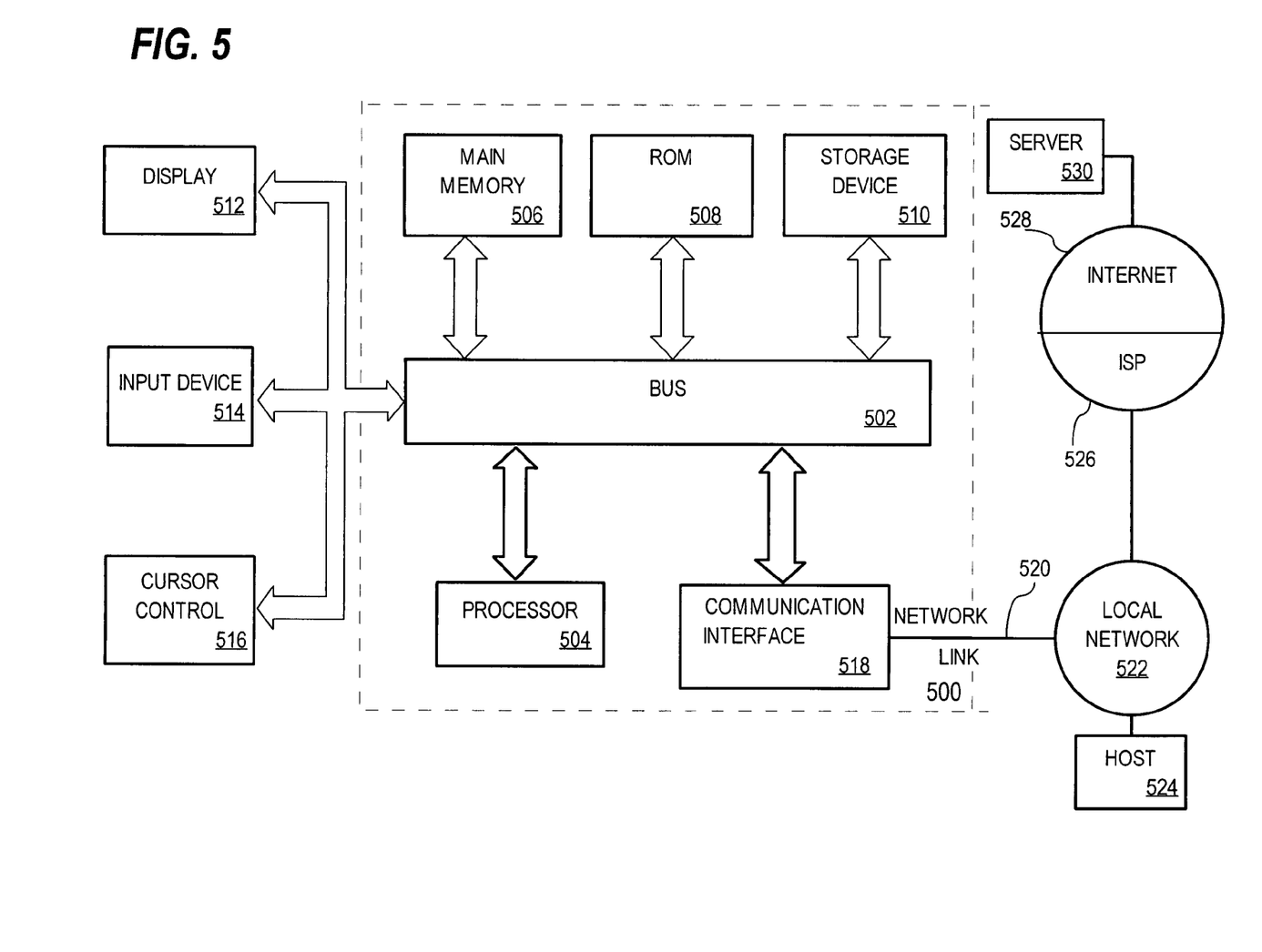
FIG. 5 is a block diagram that illustrates a computer system upon which an embodiment may be implemented.

FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for improving service accounting in a network. According to one embodiment of the invention, improving service accounting in a network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for techniques for improving service accounting in a network as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method comprising:
   in response to a first Authentication, Authorization, and Accounting (AAA) server receiving, from a first network device, a request to authorize a client to access a network resource,
      said first AAA server obtaining an accounting record for the client from an external resource communicatively coupled to the first AAA server,
      said first AAA server authorizing said client to access the network resource based on said accounting record, and
      said first AAA server sending, to the first network device, a Remote Authentication Dial In User Service (RADIUS) protocol access accept message that includes the accounting record within the RADIUS access accept message, causing the accounting record to be logged on a second network device, and to be sent by the second network device to a second AAA server within a RADIUS start session message;
   wherein the method is performed by one or more processors.

2. A computer-implemented method as recited in claim 1, further comprising obtaining the accounting record for the client from a Lightweight Directory Access Protocol directory.

3. A computer-implemented method as recited in claim 1, wherein the client is selected from the group consisting of a wireless network client, a wired network client, and a dial up client.

4. A computer-implemented method as recited in claim 1, wherein causing the accounting record to be logged comprises causing the accounting record to be logged on a dedicated logging device.

5. A computer-implemented method as recited in claim 1, wherein causing the accounting record to be logged comprises causing the accounting record to be logged on an Authentication, Authorization, and Accounting server.

6. A computer-implemented method as recited in claim 1, wherein causing the accounting record to be logged comprises causing the accounting record to be logged on a third network device.

7. A computer-implemented method as recited in claim 1, wherein causing the accounting record to be logged comprises causing the accounting record to be logged with a session start log entry.

8. A computer-implemented method as recited in claim 1, wherein causing the accounting record to be logged comprises causing the accounting record to be logged with a session stop log entry.

9. A computer-implemented method as recited in claim 1, wherein the accounting record comprises a handle to a second accounting record.

10. A computer-implemented method as recited in claim 9, further comprising:
   retrieving the second accounting record using the handle to the second accounting record; and
   causing the second accounting record to be logged.

11. A computer-implemented method as recited in claim 1, wherein the said first AAA server sending the accounting record further comprises said first AAA server sending data of said portion as a plurality of attribute-value pairs in said access accept message.

12. A computer-readable non-transitory storage medium storing instructions which, when executed by one or more processors, cause the one or more processors to perform:
   in response to a first Authentication, Authorization, and Accounting (AAA) server receiving, from a first network device, a request to authorize a client to access a network resource,
      said first AAA server obtaining an accounting record for the client from an external resource communicatively coupled to the first AAA server,
      said first AAA server authorizing said client to access the network resource based on said accounting record, and
      said first AAA server sending, to the first network device, a Remote Authentication Dial In User Service (RADIUS) protocol access accept message that includes the accounting record within the RADIUS access accept message, causing the accounting record to be logged on a second network device, and to be sent by the second network device to a second AAA server within a RADIUS start session message.

13. A computer-readable storage medium as recited in claim 12 and storing instructions which, when executed by one or more processors, cause the one or more processors to perform:

obtaining the accounting record for the client from a Lightweight Directory Access Protocol directory.

14. A computer-readable storage medium as recited in claim 12, wherein the client is selected from the group consisting of a wireless network client, a wired network client, and a dial up client.

15. A computer-readable storage medium as recited in claim 12, wherein the instructions for causing the accounting record to be logged comprise instructions for causing the accounting record to be logged on a dedicated logging device.

16. A computer-readable storage medium as recited in claim 12, wherein the instructions for causing the accounting record to be logged comprise instructions for causing the accounting record to be logged on an Authentication, Authorization, and Accounting server.

17. A computer-readable storage medium as recited in claim 12, wherein the instructions for causing the accounting record to be logged comprise instructions for causing the accounting record to be logged on a third network device.

18. A computer-readable storage medium as recited in claim 12, wherein the instructions for causing the accounting record to be logged comprise instructions for causing the accounting record to be logged with a session start log entry.

19. A computer-readable storage medium as recited in claim 12, wherein the instructions for causing the accounting record to be logged comprise instructions for causing the accounting record to be logged with a session stop log entry.

20. A computer-readable storage medium as recited in claim 12, wherein the accounting record comprises a handle to a second accounting record.

21. A computer-readable storage medium as recited in claim 20 and storing instructions which, when executed by one or more processors, cause the one or more processors to perform:

retrieving the second accounting record using the handle to the second accounting record; and causing the second accounting record to be logged.

22. A computer-readable storage medium as recited in claim 12, wherein the instructions for said first AAA server sending the accounting record further comprise instructions for said first AAA server sending data of said portion as a plurality of attribute-value pairs in said access accept message.

23. A computer-implemented method as recited in claim 1, wherein said first AAA server and said second AAA server are the same Authentication, Authorization, and Accounting (AAA) server.

24. A computer-implemented method as recited in claim 1, wherein said first AAA server and said second AAA server are different load balanced Authentication, Authorization, and Accounting servers that are both configured to implement the Remote Authentication Dial In User Service protocol (RADIUS) network protocol.

25. A computer-readable storage medium as recited in claim 12, wherein said first AAA server and said second AAA server are the same Authentication, Authorization, and Accounting (AAA) server.

26. A computer-readable storage medium as recited in claim 12, wherein said first AAA server and said second AAA server are different load balanced Authentication, Authorization, and Accounting servers that are both configured to implement the Remote Authentication Dial In User Service protocol (RADIUS) network protocol.

27. The computer-implemented method of claim 9, wherein the handle to the second accounting record comprises an identifier of the second accounting record that uniquely identifies the second accounting record from among a plurality of accounting records.

28. The computer-implemented method of claim 27, wherein the identifier of the second accounting record comprises one or more of internet protocol addresses associated with the client, an internet protocol address associated with the first or second Authentication, Authorization, and Accounting (AAA) server, or a random string.

29. The computer-readable storage medium of claim 12, wherein the instructions for said first AAA server sending a Remote Authentication Dial In User Service protocol (RADIUS) access accept message that includes the accounting record further comprise instructions for said first AAA server sending the portion in RADIUS Class Attributes or RADIUS Vendor Specific Attributes.

30. The computer-readable storage medium of claim 20, wherein the handle to the second accounting record comprises an identifier of the second accounting record that uniquely identifies the second accounting record from among a plurality of accounting records.

31. The computer-readable storage medium of claim 30, wherein the identifier of the second accounting record comprises one or more of internet protocol addresses associated with the client, an internet protocol address associated with the first or second Authentication, Authorization, and Accounting (AAA) server, or a random string.

* * * * *